United States Patent Office 3,277,073
Patented Oct. 4, 1966

---

3,277,073
NOVEL POLYPEPTIDES AND PRODUCTION THEREOF
Roger Boissonnas, Bottmingen, Basel-Land, Switzerland, assignor to Sandoz Ltd., Basel, Switzerland
No Drawing. Filed Feb. 26, 1963, Ser. No. 261,207
Claims priority, application Switzerland, Feb. 27, 1962, 2,399/62
9 Claims. (Cl. 260—112.5)

The present invention relates to novel salts of a biologically active polypeptide with a non-toxic aliphatic hydroxymonocarboxylic acid of 2 to 20 hydroxy radicals and to a process for their production. It should be noted that said polypeptides may be of natural or synthetic origin.

The present invention provides the above salts and also a process for their production, which process comprises reacting in solution a biologically active polypeptide with a non-toxic aliphatic polyhydroxymonocarboxylic acid of 2 to 20 hydroxy radicals and isolating the resulting salt.

The present invention makes available dry, relatively stable chemical derivatives of biologically active polypeptides which have the necessary potency for the therapeutic administration of the said polypeptides. There is a need for the said polypeptides in a form which can be administered sublingually, and from which the active substance is readily resorbed without appreciable loss, as the forms hitherto available could either be administered only parenterally, i.e. intramuscularly, subcutaneously or intravenously, or on sublingual administration were resorbed badly or unevenly and hence did not make possible an economical therapy.

Suitable starting materials for producing salts of the present invention are biologically active polypeptides of natural or synthetic origin, e.g. oxytocin, bradykinin, lysin-vasopressin, arginin-vasopressin, eledoisin and their structural analogues. Biologically active polypeptides which can be obtained either by extraction from animal organs or lower organisms or by polypeptide synthesis are often compounds which are chemically impure; with impure materials it is possible to assay by biological methods either the solutions of the polypeptides, which serve as starting materials, or the salts of the invention. The present invention therefore includes not only the said salts in chemically pure form, but also biologically assayed preparations containing these salts.

Examples of the said non-toxic hydroxymonocarboxylic acids having 2 to 20 hydroxy radicals are gluconic acid, galactonic acid, mannonic acid, lactobionic acid and other functionally substituted hydroxymonocarboxylic acids having 2 to 20 hydroxy radicals; preferably these acids have 3 to 10 hydroxy radicals in the molecule.

The salts produced in accordance with the invention may be satisfactorily isolated in solid form as may be seen from the examples given hereinafter, they are relatively stable over long periods, even when storage conditions are unfavourable.

The present invention makes available the biologically active polypeptides for therapeutic use in a form in which they can be taken buccally or sublingually instead of having to be injected. Sublingual administration in particular has the advantage that the biologically active component can be resorbed from the mucous membrane of the mouth without having to pass through the digestive tract. For resorption of a biologically active polypeptide after sublingual administration the rapidity with which it dissolves in the saliva is evidently a factor of importance at least equal to that of its absolute solubility in the saliva, since the high local concentration produced sets up favorable conditions for the resorption of the active component from the mucous membrane. This rate of solution is particularly high in the case of the new salts of the present invention.

The salts of the invention may, for example, be produced as follows: a hydroxymonocarboxylic acid having 2 to 20 hydroxyl radicals, e.g. gluconic acid, in at least equimolar quantity is added to an aqueous solution of a biologically active polypeptide, e.g. natural or synthetic oxytocin, the solution is then lyophilized or reduced in volume in a vacuum.

In order to produce a pharmaceutical composition the resultant dry preparation is mixed with one or more neutral solid diluents which are physiologically acceptable, e.g. mannitol, lactose, starch and talc, and then tabletted by a known method. In addition, such tablets may contain suitable preserving and stabilizing agents, solubilizers, sweetening and colouring agents or flavouring agents. These neutral diluents may also be added at an earlier stage, i.e. to the solution of the reactants before evaporation. The starting material in solution may also contain one or more inorganic salts in addition to the biologically active polypeptide components. Although it is advantageous to use polypeptide and acid in equimolar amounts, it is possible to use excess acid without harm, since the excess free acid is converted into the corresponding lactone and hence cannot have any detrimental effect on the tolerability of the preparation.

The present invention also includes pharmaceutical compositions containing, in addition to an inert carrier, one or more of the salts of the invention.

In the following non-limitative examples, all temperatures are stated in degrees centigrade.

EXAMPLE 1

*(a) Oxytocin gluconate*

50 cc. of a 1% aqueous solution of gluconic acid are added to 2 litres of a 0.1% solution of oxytocin in 0.01 N acetic acid and lyophilized. The lyophilisate is mixed with 250 g. of mannitol and the resulting powder used to produce tablets.

*(b) Oxytocin lactobionate*

The material is produced in analogous manner to (a).

EXAMPLE 2

*Vasopressin galactonate*

75 cc. of a 1% aqueous solution of galactonic acid and 100 g. of mannitol are added to 2 litres of a 0.1% solution of vasopressin in 0.01 N acetic acid and lyophilized.

EXAMPLE 3

*Bradykinin lactobionate*

100 cc. of a 1% aqueous solution of lactobionic acid are added to 1 litre of a 0.2% solution of bradykinin in 1% aqueous sodium chloride solution and evaporated in a vacuum below 30°.

I claim:
1. A salt of a biologically active polypeptide with a non-toxic aliphatic hydroxymonocarboxylic acid of 2 to 20 hydroxy radicals, said polypeptide being selected from the group consisting of oxytocin, bradykinin, lysin-vasopressin, arginin-vasopressin, eledoisin and their structural analogues.

2. A salt of a biologically active polypeptide selected from the group consisting of synthetically occurring oxytocin, naturally occurring oxytocin, vasopressin and bradykinin with a non-toxic aliphatic hydroxymonocarboxylic acid of 2 to 20 hydroxy radicals.

3. A salt of a biologically active polypeptide selected from the group consisting of synthetically occurring oxytocin, naturally occurring oxytocin, vasopressin and bradykinin with gluconic acid.

4. A salt of a biologically active polypeptide selected from the group consisting of synthetically occurring oxytocin, naturally occurring oxytocin, vasopressin and bradykinin with lactobionic acid.

5. A salt of biologically active polypeptide selected from the group consisting of synthetically occurring oxytocin, naturally occurring oxytocin, vasopressin and bradykinin with galactonic acid.

6. Oxytocin gluconate.
7. Oxytocin lactobionate.
8. Vasopressin galactonate.
9. Bradykinin lactobionate.

References Cited by the Examiner

FOREIGN PATENTS 229,973    8/1960    Australia.
1,120,460   12/1961   Germany.

LEWIS GOTTS, *Primary Examiner.*

PERRY A. STITH, *Assistant Examiner.*